March 29, 1932. H. E. WELBOURNE 1,851,142
IMPLEMENT HITCH
Filed Nov. 28, 1930 2 Sheets-Sheet 1
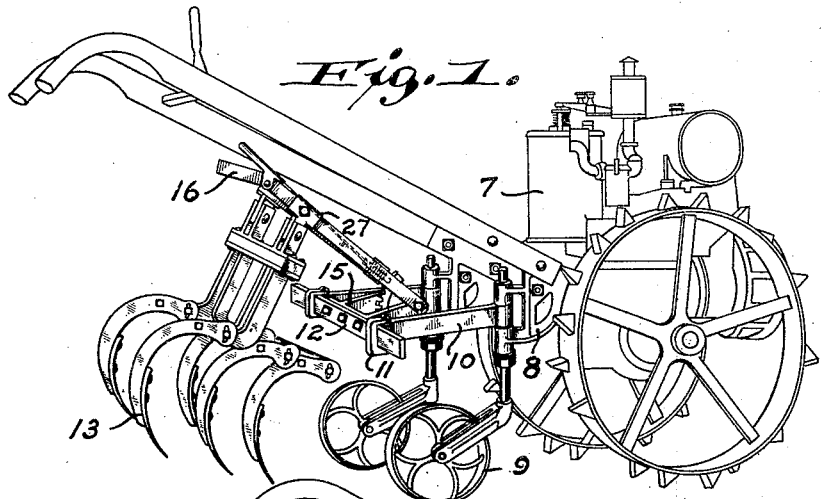
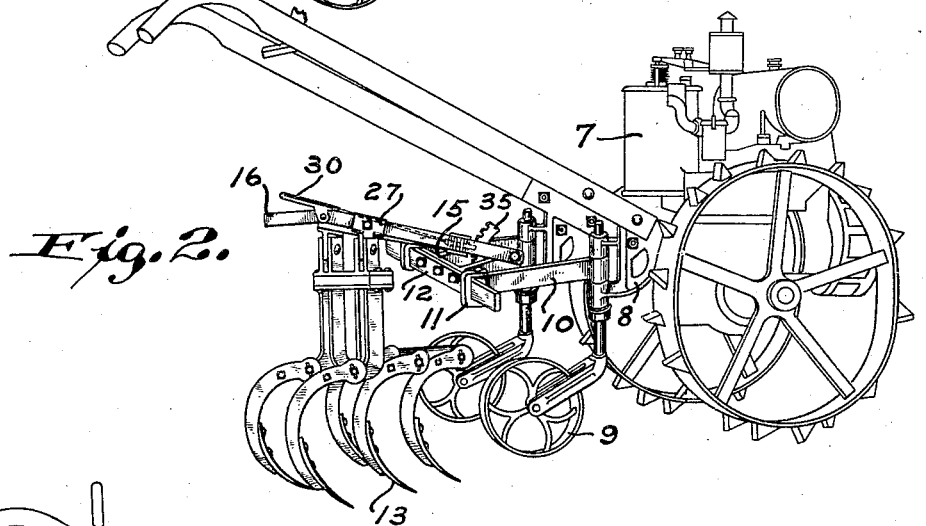
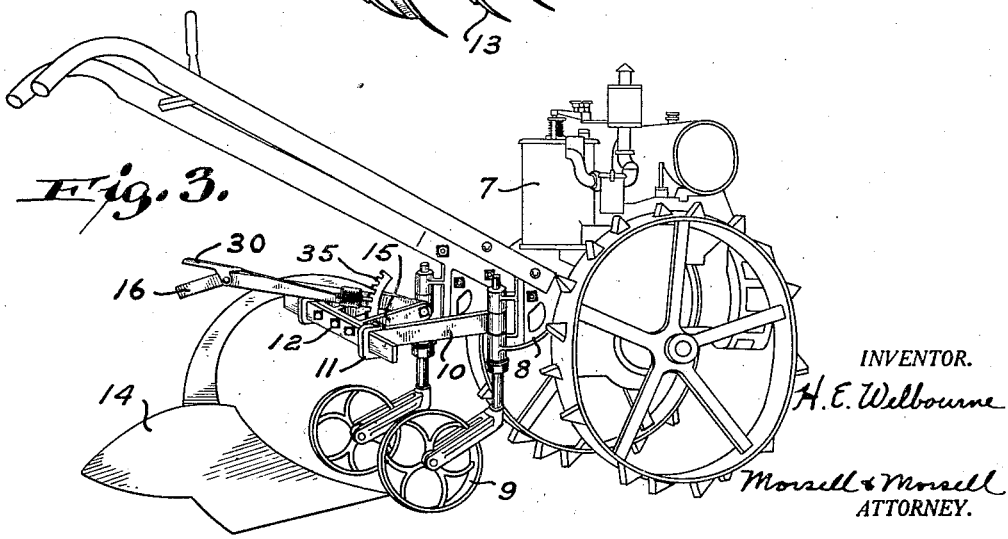
INVENTOR.
H. E. Welbourne
Morsell & Morsell
ATTORNEY.

March 29, 1932.  H. E. WELBOURNE  1,851,142
IMPLEMENT HITCH
Filed Nov. 28, 1930   2 Sheets-Sheet 2

INVENTOR.
H. E. Welbourne
BY Morsell & Morsell
ATTORNEY.

Patented Mar. 29, 1932

1,851,142

UNITED STATES PATENT OFFICE

HARRY E. WELBOURNE, OF WEST ALLIS, WISCONSIN, ASSIGNOR TO PIONEER MANUFACTURING COMPANY, OF WEST ALLIS, WISCONSIN, A CORPORATION OF WISCONSIN

IMPLEMENT HITCH

Application filed November 28, 1930. Serial No. 498,660.

The present invention relates in general to improvements in the art of working the soil, and relates more specifically to improvements in the construction and operation of hitches or the like for facilitating attachment of various forms of earth working implements to a support or guiding device such as a tractor, and for subsequently enabling adjustment thereof to meet various operating conditions.

An object of the invention is to provide an improved hitch for implements or the like, which is simple in construction and efficient in operation.

Another object of the invention is to provide a hitch which is readily manipulable to effect adjustment of an implement associated therewith in order to meet various conditions of operation.

A further object of the invention is to provide a hitch which is adapted to effectively cooperate with various forms of implements such as cultivators, plows, harrows or the like.

Still another object of the invention is to provide an improved hitch which is especially applicable to tractors of the so called garden type wherein the tractor is motor driven but is manually guided by an operator walking at the rear of the tractor.

A further object of the invention is to provide a hitch which is compact and durable in construction, and which will permit rapid withdrawal of the implement to ineffective position.

Another object of the invention is to provide an improved hitch which may be quickly and conveniently applied to any relatively standard tractor, and which is in turn readily associable with various types of implements.

These and other objects and advantages will appear from the following detailed description.

A clear conception of an embodiment of the invention and of the mode of constructing and of manipulating hitches built in accordance therewith, may be had by referring to the drawings accompanying and forming a part of this specification in which like reference characters designate the same or similar parts in the various views:

Fig. 1 is a perspective view of a motor driven garden tractor having an implement hitch applied to connect a cultivator thereto, the cultivator being shown in elevated ineffective position;

Fig. 2 is a similar side view of the tractor, hitch and cultivator, showing the latter lowered into effective or operative position;

Fig. 3 is a similar side view of the tractor, showing the hitch associated with a plow of relatively standard construction, and also showing the plow in effective or operative position;

Figure 4:
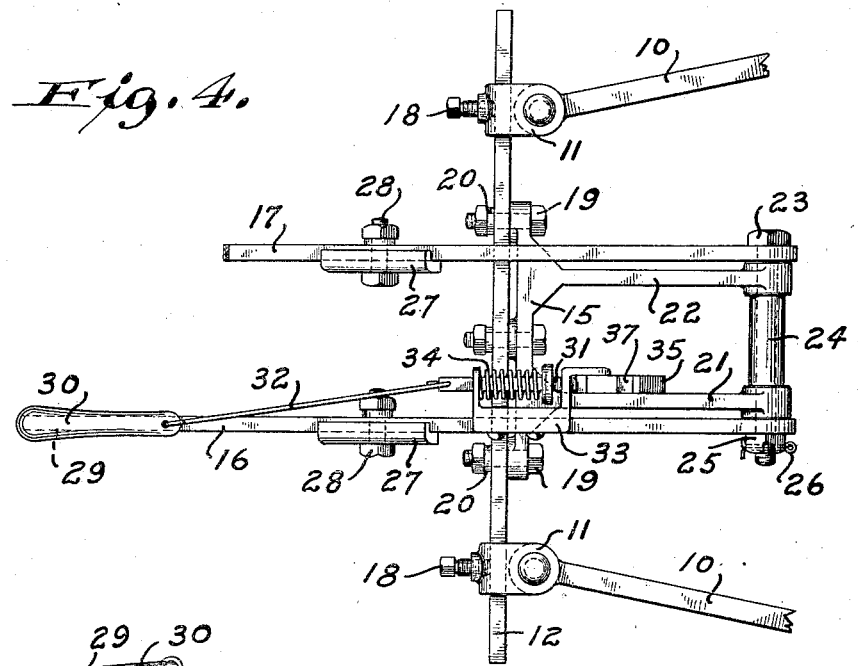
Fig. 4 is an enlarged top view of the improved hitch alone, showing the adjusting lever in its extreme lowered position.

In Figs. 1, 2 and 3 the improved hitch has been applied to a motor propelled garden tractor 7 of relatively standard construction, having a rear bracket 8 which provides a pivotal support for caster wheels 9 and for implement attaching arms 10. The tractor 7 is provided with the usual propelling wheels and during transportation thereof over the ground, the rear caster wheels 9 trail in back of the corresponding propelling wheels. The rear ends of the arms 10 are usually provided with clevises 11 adapted to receive an implement attaching device such as the hitch supporting bar 12. As specifically shown in Figs. 1 and 2 a cultivator 13 of relatively standard construction has been associated with the improved hitch, whereas in Fig. 3 a plow 14 likewise of relatively standard construction, has been substituted for the cultivator 13. While only two forms of implements have been illustrated herein as being applied to the improved hitch, it will be understood that other forms of implements are likewise associable with the hitch.

Figure 5:
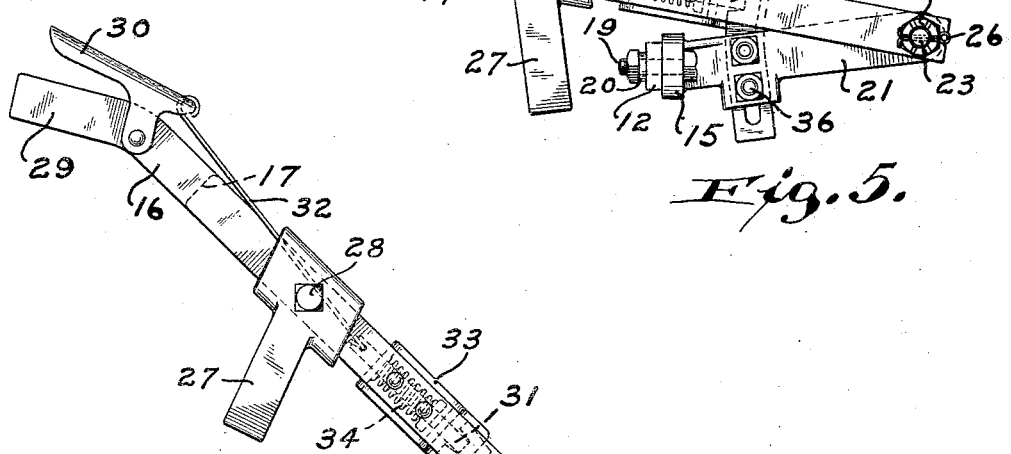
Fig. 5 is a similarly enlarged side view of the hitch with the adjusting lever likewise in its extreme lowered position.
Figure 6:
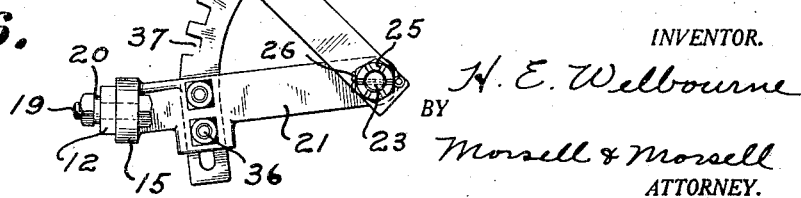
Fig. 6 is a similar side view of the improved hitch showing the adjusting lever in its extreme elevated position.

The improved hitch forming the subject of the present invention is shown more in detail in Figs. 4, 5 and 6, and comprises in general a transverse supporting bar 12, an adjusting bracket 15, one or more adjusting arms 16, 17 pivotally associated with the forward end of the bracket 15, and means for locking the arms 16, 17 and the implement associated therewith in various positions of vertical adjustment.

The transverse supporting bar 12 may be rigidly attached to the clevises 11 by means of clamping screws 18, and the adjusting bracket 15 is rigidly attached to the supporting bar 12 by means of bolts 19 and lock washers 20 coacting therewith. The adjusting bracket 15 has two laterally spaced upwardly inclined projections 21, 22 to the foremost ends of which the adjusting arms 16, 17 are pivotally attached by means of a transverse bolt 23. When two adjusting arms 16, 17 are utilized, these are associated with the pivot bolt 23 at the outer sides of the projections 21, 22 as shown in Fig. 4, and the portion of the bolt 23 between the projections 21, 22 is preferably embraced by a spacing sleeve 24. The nut 25 cooperating with the bolt 23 is also preferably provided with means such as a cotter pin 26 for locking this nut upon the bolt 23.

The rear portions of the adjusting arms 16, 17 are provided with implement attaching elements 27 secured to the arms 16, 17 by means of bolts 28. When an implement such as a cultivator 13 is associated with the spacing arms 16, 17, the implement is rigidly attached to the depending portions of the elements 27 thereby rigidly connecting the arms 16, 17 and compelling these arms to swing simultaneously about the pivot bolt 23. One of the adjusting arms 16 is provided with a handle 29 and with a latch operating lever 30, the latter being associated with a latch 31 by means of a rod 32. The latch 31 is slidably supported in a bracket 33 secured to the side of the arm 16 and is resiliently urged in a forward direction by means of a spring 34. The latch 31 is cooperable with a notched segment 35 which is adjustably associated with and attached to the projection 21 of the bracket 15 by means of clamping bolts 36. By pressing the latch lever 30, the latch 31 is withdrawn from an adjacent notch 37 of the segment 35, and the arms 16, 17 may thereafter be swung about the pivot bolt 23 in an obvious manner.

When a plow 14 or other implement having a single draft arm is associated with the improved hitch, the draft arm of the plow 14 may be rigidly attached directly to a single adjusting arm 16 which may then be associated with the pivot bolt 23 between the projections, 21, 22, as shown in Fig. 3. The use of two adjusting arms 16, 17 is then unnecessary and the formation of the plow draft arm is ordinarily such that the use of the implement supporting elements 27 may likewise be dispensed with.

During normal operation of the improved hitch, it will be apparent that after the hitch has been properly secured to the arms 10 of a tractor 7, and an implement has been properly associated with the hitch, the position of the implement with respect to the ground may be readily altered by merely manipulating the lever 30 and the adjusting arm 16 with which this lever is associated. By releasing the latch 31 at the proper moment, this latch may be caused to cooperate with any desired notch 37 of the segment 35 and the implement will be positively maintained in the adjusted position. When the latch 31 is caused to cooperate with the upper notch 37 of the segment 35 the implement will be elevated to ineffective position with respect to the ground, as clearly shown in Fig. 1 and will be rigidly retained in such ineffective position. If the latch 31 is caused to cooperate with one of the lower notches 37 of the segment 35, the implement will likewise be rigidly locked in effective or operative position.

An important feature of the present invention is the formation of the adjusting bracket 15 with the integral projections 21, 22 thereof extending upwardly and forwardly. This upper inclination of the projections 21, 22 provides a long range of adjustment for the implements associated with the improved hitch and enables lowering of the implement to a greater distance than would be possible if the projections 21, 22 were not upwardly inclined. The fact that the projections 21, 22 extend forwardly toward the tractor 7, for a considerable distance, also permits the use of relatively long adjusting arms 16, 17 without interfering with manipulation of the tractor 7. These long arms produce considerable leverage, enabling convenient lifting of relatively heavy implements. The removable pivot bolt 23 also provides for convenient detachment of the implements from the tractor 7, and the two spaced projections 21, 22 of the adjusting bracket 15 further provide for convenient attachment of various forms of implements to the hitch.

From the foregoing description it will be apparent that the improved hitch is simple and compact in construction and highly efficient in operation. The hitch is readily manipulable to effect adjustment of any implement associated therewith, and is also cooperable with implements of widely varying nature. The hitch is moreover conveniently applicable to standard tractors and while being simple in construction is nevertheless sufficiently rigid to avoid breakage thereof during normal use.

It should be understood that it is not desired to limit the invention to the exact details of construction and to the precise mode of operation herein shown and described, for various modifications within the scope of the claims may occur to persons skilled in the art.

It is claimed and desired to secure by Letters Patent:

1. In combination, a transverse supporting bar formed for rigid attachment to a tractor, a bracket rigidly secured to said bar, said bracket having an upwardly inclined and forwardly extending fixed projection, and an implement supporting arm pivotally associated with said projection in front of said bar.

2. In combination, a transverse supporting bar formed for rigid attachment to a tractor, a bracket rigidly secured to said bar, said bracket having an upwardly inclined and forwardly extending fixed projection, and an implement supporting arm having its forward portion pivotally associated with a forward upper portion of said projection.

3. In combination, a transverse supporting bar formed for attachment to a tractor, a bracket secured to said bar, said bracket having an upwardly inclined and forwardly extending projection, an implement supporting arm pivotally associated with said projection in front of said bar, and means for locking said arm in various positions of adjustment relative to said projection.

4. In combination, a transverse supporting bar formed for attachment to a tractor, a bracket secured to said bar, said bracket having an upwardly inclined and forwardly extending projection, an implement supporting arm having its forward portion pivotally associated with a forward upper portion of said projection, and means for locking said arm in various positions of adjustment relative to said projection.

5. In combination, a transverse supporting bar having its opposite ends formed for rigid attachment to a tractor, a bracket rigidly secured to said bar intermediate said ends, said bar having an upwardly inclined and forwardly extending fixed projection, and an implement supporting arm pivotally associated with the forward portion of said projection.

6. In combination, a transverse supporting bar formed for rigid attachment to a tractor, a bracket rigidly secured to the medial portion of said bar, said bracket having a pair of laterally spaced upwardly inclined and forwardly extending fixed projections, and an implement supporting arm pivotally associated with the forward portions of said projections and extending rearwardly over said bar.

7. In combination, a transverse supporting bar formed for attachment to a tractor, a bracket secured to the medial portion of said bar, said bracket having a pair of laterally spaced upwardly inclined and forwardly extending projections, an implement supporting arm pivotally associated with the forward portions of said projections and extending rearwardly over said bar, and means for locking said arm in various positions of adjustment relative to said bar.

8. In combination, a transverse supporting bar formed for rigid attachment at its opposite ends to a tractor, a bracket rigidly secured to said bar between said ends, said bracket having a pair of laterally spaced upwardly inclined and forwardly extending fixed projections, a pivot detachably associated with the forward ends of said projections, and an implement supporting arm swingably associated with said pivot and extending rearwardly over said bar.

9. In combination, a transverse supporting bar formed for attachment at its opposite ends to a tractor, a bracket secured to said bar between said ends, said bracket having a pair of laterally spaced upwardly inclined and forwardly extending projections, a pivot detachably associated with the forward ends of said projections, an implement supporting arm swingably associated with said pivot and extending rearwardly over said bar, and means for locking said arm in various positions of angular adjustment relative to the axis of said pivot.

10. In combination, a transverse supporting bar formed for attachment to a tractor, a bracket secured to the medial portion of said bar, said bracket having an upwardly inclined and forwardly extending projection, an implement supporting arm pivotally associated with the forward portion of said projection, a notched segment secured to said projection, and means for locking said arm to said segment in various positions of adjustment.

11. In combination, a transverse supporting bar formed for rigid attachment in horizontal position to the rear portion of a tractor, a bracket rigidly secured to the medial portion of said bar, said bracket having a pair of upwardly inclined and forwardly extending laterally spaced fixed projections, a pivot detachably associated with the forward ends of said projections, a pair of implement supporting arms swingably associated with said pivot and extending rearwardly over said bar, and implement supporting elements secured to said arms rearwardly of said bar and adapted for rigid interconnection by an implement.

12. In combination, a transverse supporting bar formed for attachment in horizontal position to the rear portion of a tractor, a bracket secured to the medial portion of said bar, said bracket having a pair of upwardly inclined and forwardly extending laterally spaced projections, a pivot detachably associated with the forward ends of said projections, a pair of implement supporting arms swingably associated with said pivot and extending rearwardly over said bar, and means for locking said arms in various positions of angular adjustment relative to the axis of said pivot.

13. In combination, a transverse supporting bar formed for attachment in horizontal position to the rear portion of a tractor, a bracket secured to the medial portion of said bar, said bracket having a pair of upwardly inclined and forwardly extending laterally spaced projections, a pivot detachably associated with the forward ends of said projections, a pair of implement supporting arms swingably associated with said pivot and extending rearwardly over said bar, a notched segment secured to one of said projections, and means for locking one of said arms to said segment in various positions of adjustment.

14. In combination, a transverse supporting bar formed for rigid attachment at its opposite ends to the rear portion of a tractor, a bracket rigidly attached to the medial portion of said bar between said ends, said bracket having a pair of laterally spaced upwardly inclined and forwardly extending fixed projections, a pivot detachably associated with the forward ends of said projections, a pair of implement supporting arms pivotally associated with said pivot at the outer sides of said projections, said arms extending rearwardly over said bar, and means for rigidly interconnecting said arms rearwardly beyond said bar.

15. In combination, a transverse supporting bar formed for attachment at its opposite ends to the rear portion of a tractor, a bracket rigidly attached to the medial portion of said bar between said ends, said bracket having a pair of laterally spaced upwardly inclined and forwardly extending projections, a pivot detachably associated with the forward ends of said projections, a pair of implement supporting arms pivotally associated with said pivot at the outer sides of said projections, said arms extending rearwardly over said bar, means for rigidly interconnecting said arms rearwardly beyond said bar, a notched segment secured to said bracket, and means for locking one of said arms in various positions relative to said bracket.

16. In combination, a transverse supporting bar, a pair of laterally spaced clevises adjustable along the opposite end portions of said bar, an attaching arm pivotally secured to each of said clevises and adjustably associable with the rear portion of a tractor, a bracket secured to said bar between said clevises and having an upwardly inclined and forwardly extending projection, an implement supporting arm pivotally associated with said projection in front of said bar, and means for locking said arm in various positions of adjustment relative to said projection.

17. In combination, a transverse supporting bar, a pair of laterally spaced clevises adjustable along the opposite end portions of said bar, an attaching arm pivotally secured to each of said clevises and adjustably associable with the rear portion of a tractor, a bracket disposed between said clevises and having a portion located in front of said bar, an implement adjusting arm pivotally associated with the portion of said bracket in front of said bar and extending rearwardly thereover, and means for locking said adjusting arm in various positions of adjustment relative to said bracket.

In testimony whereof, I affix my signature.

HARRY E. WELBOURNE.